United States Patent
Wang et al.

(10) Patent No.: US 9,283,534 B2
(45) Date of Patent: Mar. 15, 2016

(54) STEAM INJECTION NOZZLE FOR EMULSIFICATION/DISTILLATION

(71) Applicant: Xerox Corporation, Norwalk, CT (US)

(72) Inventors: Yulin Wang, Oakville (CA); Yu Liu, Burlington (CA); Ke Zhou, Oakville (CA); Frank Ping-Hay Lee, Oakville (CA)

(*) Notice: Subject to any disclaimer, the term of this patent is extended or adjusted under 35 U.S.C. 154(b) by 34 days.

(21) Appl. No.: 14/171,481

(22) Filed: Feb. 3, 2014

(65) Prior Publication Data

US 2015/0217253 A1  Aug. 6, 2015

(51) Int. Cl.
- *C08J 3/00* (2006.01)
- *B01J 13/00* (2006.01)
- *G03G 9/08* (2006.01)
- *B01J 13/02* (2006.01)
- *C09B 67/02* (2006.01)

(52) U.S. Cl.
CPC *B01J 13/00* (2013.01); *B01J 13/02* (2013.01); *C09B 67/0097* (2013.01); *G03G 9/0804* (2013.01)

(58) Field of Classification Search
CPC ................................ G03G 9/0804; B01J 13/00
USPC ............... 523/326, 337; 422/225; 430/137.14
See application file for complete search history.

(56) References Cited

U.S. PATENT DOCUMENTS

| | | | |
|---|---|---|---|
| 8,932,792 B2 * | 1/2015 | Liu | ........................... F17C 5/00 137/1 |
| 2014/0147786 A1 | 5/2014 | Liu et al. | |
| 2014/0200298 A1 | 7/2014 | Liu et al. | |
| 2014/0255842 A1 | 9/2014 | Liu et al. | |
| 2015/0086922 A1 | 3/2015 | Liu et al. | |

* cited by examiner

*Primary Examiner* — Edward Cain

(57) ABSTRACT

A process and device for making a latex emulsion suitable for use in a toner composition which uses Steam Injection Emulsification (SIE) are disclosed, including a steam injection nozzle system, where the nozzle has one or more holes for releasing steam into an emulsion, which induces turbulence in the emulsion to facilitate emulsification, solvent distillation or both to produce latex emulsions for making toner.

22 Claims, 3 Drawing Sheets

STEAM INJECTION NOZZLE FOR EMULSIFICATION/DISTILLATION

FIELD

The present disclosure relates to phase inversion emulsification (PIE) processes for producing resin emulsions useful in making toners, more specifically, a process applying Steam Injection Emulsification (SIE) for the conversion of resins to latexes and enhanced removal of organic solvents is disclosed, including designs of steam injection nozzle systems which provide increased surface contact areas between steam and resin-solvent solutions.

BACKGROUND

Latex emulsions of resins may be produced using solvent-based phase inversion emulsification (PIE) processes in which resins are dissolved in a mixture of water and organic solvent(s) (e.g., methyl ethyl ketone (MEK), isopropanol (IPA) or both) to form a homogenous water-in-oil (W/O) dispersion (i.e., water droplets dispersed in continuous oil). Subsequently, water is added to convert the dispersion into a stable oil-in-water (O/W) latex.

Energy intensive processing of the latex then is used to remove virtually all traces of organic solvents, and finally surfactant and other preservatives may be added to provide a stable latex with relatively high solids content. Such latex may be used for many purposes including the application of Emulsion Aggregation (EA) methods for the production of toner particles (see, e.g., U.S. Pat. Nos. 5,853,943, 5,902,710; 5,910,387; 5,916,725; 5,919,595; 5,925,488, 5,977,210 and 5,994,020, and U.S. Pub. No. 2008/0107989, the disclosure of each of which hereby is incorporated by reference in entirety).

Batch processes use bulk materials (for example, about in volumes up to and more than 5,000 gallons) and are time consuming (for example, 25 hrs or more cycle time), labor intensive and have lot-to-lot variation. Further, one of the main PIE costs directly correlates with processing time, solvent distillation (~18 hrs) being one of the more time consuming step, in which IPA removal, for example, is particularly difficult because IPA has affinity for water and can cause foaming. Significant amount of effort in speeding up the emulsification and solvent distillation processes has been applied with varying success.

Therefore, new emulsification processes, which provide both reduction in costs (on system simplification) and time savings (e.g., emulsification time and solvent distillation time), for latex preparation is highly desirable for overcoming batch process issues.

SUMMARY

The instant disclosure describes a process for making a latex emulsion suitable for use in a toner composition which uses Steam Injection Emulsification (SIE) and various steam injection nozzle designs, which various designs provide increased surface contact areas between steam and a resin solution, and thus, shorten processing time and help reduce residual solvent in a final product. Further, the present disclosure demonstrates that there is unexpected improvement on the introduction of turbulence when mixing steam with a resin solution, including the use of multiple steam injection nozzle systems, which multiple nozzle systems introduce enough steam and turbulence during the steam injection distillation process for large scale manufacture reactors.

In embodiments, a method of phase inversion emulsification (PIE) is disclosed including combining a polyester resin, one or more organic solvents and a neutralizing agent to form a mixture in a reaction vessel; injecting steam into the reaction vessel, and mixing the mixture comprising turbulence induced by the steam to emulsify the mixture, where the injecting of steam is carried out with a steam injection nozzle including an "L" shaped nozzle, an "I" shaped nozzle and an "S" shaped nozzle; and applying a vacuum within the reaction vessel to remove the one or more solvents, where the steam injection nozzle provides increased surface contact areas between steam and the mixture relative to contacting steam and the mixture without nozzles.

In embodiments, a method of preparing a toner is disclosed including combining a resin, one or more organic solvents and a neutralizing agent, to form a mixture in a reaction vessel; injecting steam into the reaction vessel, and mixing the mixture comprising turbulence induced by the steam to emulsify the mixture, where the injecting is carried out with a steam injection nozzle including an "L" shaped nozzle, an "I" shaped nozzle and an "S" shaped nozzle; applying a vacuum within the reaction vessel to remove the one or more organic solvents to form an emulsion; adding an optional at least one second resin to the emulsion; optionally adding a wax, a colorant or both to the emulsion; optionally adding a flocculent to the emulsion; aggregating particles in the emulsion; freezing particle growth in the emulsion to form frozen particles; optionally adding a shell resin; optionally coalescing the frozen particles in the emulsion to form toner particles; and collecting the frozen particles or the toner particles from the emulsion, where the steam injection nozzle provides increased surface contact areas between steam and the mixture relative to preparing the emulsion without steam.

In embodiments, a Steam Injection Emulsification (SIE) system is disclosed including:
a) a reaction vessel comprising:
i) one or more conduits in fluid communication with the reactor vessel and
ii) an impeller;
b) a steam injection nozzle connected to one of the one or more conduits, where the steam injection nozzle includes an "L" shaped nozzle, an "I" shaped nozzle and an "S" shaped nozzle, and where the steam injection nozzle is in fluid communication with the reaction vessel; and
c) another one of the one or more conduits connected to a device for producing a vacuum within the reaction vessel, where the steam injection nozzle is configured to provide increased surface contact areas between steam and a mixture comprising a resin and a solvent relative to contacting steam and said mixture without said nozzle.

BRIEF DESCRIPTION OF THE DRAWINGS

The attached figures are not to be construed as limiting and are provided to exemplify certain embodiments of interest.

DETAILED DESCRIPTION

Figure 1:
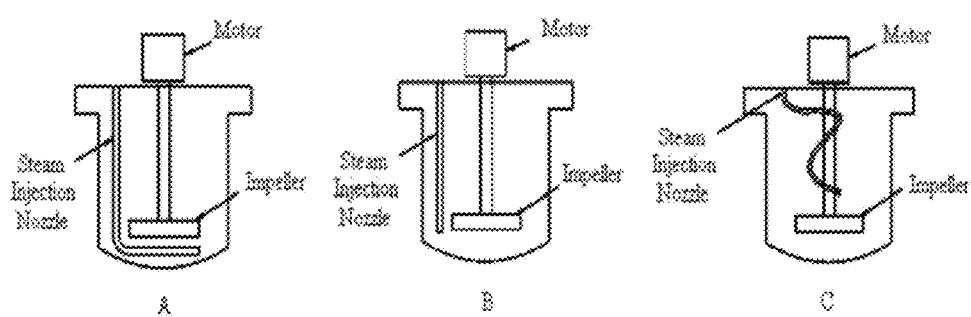
FIG. 1 shows different steam injection nozzle layout designs for a Steam Injection Emulsification (SIE)/distillation process. A; "L" shape of steam injection nozzle; B: "I" shape of steam injection node; and C: "S" shape of steam injection nozzle.

Latexes may be produced using solvent reuse formulation to complete PIE. In the process, the resin may be dissolved in a solvent (e.g., methyl ethyl ketone (MEK), isopropanol (IPA) or both), distilled (DI) water and ammonia. A small quantity of base, such as, ammonia or a basic buffer, may be used to promote resin dispersion within the mixture of organic solvents and DI water. A second quantity of base, such as, ammonia, or a basic buffer, may then be added to the homogenous resin dissolution to neutralize any acid groups on the resin chains, followed by the addition of a second quantity of DI water to generate a uniform suspension of particles in a water continuous phase via phase inversion.

In the present disclosure, a method of PIE is disclosed, including combining a resin, an organic solvent and an optional neutralizing agent to form a mixture in a reaction vessel; injecting steam into the reaction vessel, and mixing the mixture, comprising turbulence induced by the steam to emulsify the mixture, where the injecting is carried out with a steam injection nozzle including an "L" shaped nozzle, an "I" shaped nozzle and an "S" shaped nozzle; and applying a vacuum within the reaction vessel to remove the solvent(s), where the steam injection nozzle provides increased surface contact areas between steam and the mixture relative to contacting the steam and mixture without the nozzle.

In embodiments, a Steam Injection Emulsification (SIE) system is disclosed including: a reaction vessel containing one or more conduits in fluid communication with the reactor vessel and an impeller, a steam injection nozzle connected to one of the one or more conduits, where the steam injection nozzle includes an "L" shaped nozzle, an "I" shaped nozzle and an "S" shaped nozzle, and where the steam injection nozzle is in fluid communication with the reaction vessel; and a device attached to another of the one or more conduits, which device produces a vacuum within the reaction vessel, where the steam injection nozzle is configured to provide increased surface contact areas between steam and a mixture comprising a resin and a solvent relative to contacting steam and said mixture without said nozzle.

The temperature of the introduced steam, which generally is produced from water, such as, distilled water, deionized water or any water treated to reduce particulates, solutes, such as, salts, and any other materials that may be dissolved or carried in the water, can vary from about 100° C., from about 105° C., from about 110° C. or higher. Hence, the temperature can range from about 100° C. to about 130° C., from about 100° C. to about 120° C., from about 105° C. to about 120° C., from about 105° C. to about 110° C., and so on, and temperature outside of those ranges can be used.

The amount of and temperature of steam introduced into the emulsion are varied to yield an emulsion at a desired temperature, for example, depending on the resins used, the solvent(s) used or both, and can range from about 60° C. to about 110° C. from about 60° C. to about 100° C., from about 65° C. to about 95° C., from about 65° C. to about 90° C., from about 70° C. to about 90° C., from about 70° C. to about 80° C., although temperatures outside of those ranges can be used as a design choice.

In embodiments, by using the designs as disclosed herein at the distillation stage, organic solvents may be removed efficiently, the distillation process may be significantly shortened with lower amounts of organic solvent present in the latex or both.

Unless otherwise indicated, all numbers expressing quantities and conditions, and so forth used in the specification and claims are to be understood as being modified in all instances by the term, "about." "About," is meant to indicate a variation of no more than 10% from the stated value. Also used herein is the term, "equivalent," "similar," "essentially," "substantially," "approximating," and, "matching," or grammatic variations thereof, have generally acceptable definitions or at the least, are understood to have the same meaning as, "about."

"Mixing under turbulence" occurs when a flow of fluid becomes large, the streamlines become irregular and parcels of the flowing fluid begin to move in a highly irregular path while maintaining a net downstream velocity.

Currently, ULM polyester toners result in a benchmark Minimum Fix Temperature (MFT) which is reduced by about 20° C. as compared to conventional EA toners. In embodiments, an ULM toner of the present disclosure may have an MFT of from about 100° C. to about 130° C., from about 105° C. to about 125° C., from about 110° C. to about 120° C.

Resins

Any resin may be utilized in forming a latex emulsion of the present disclosure. In embodiments, the resins may be an amorphous resin, a crystalline resin, and/or a combination thereof. In embodiments, the resin may be a polyester resin, including the resins described, for example, in U.S. Pat. Nos. 6,593,049 and 6,756,176, the disclosure of each of which hereby is incorporated by reference in entirety. Suitable resins also may include a mixture of an amorphous polyester resin and a crystalline polyester resin as described in U.S. Pat. No. 6,830,860, the disclosure of which is hereby incorporated by reference in entirely. Suitable resins may include a mixture of high molecular and low molecular weight amorphous polyester resins.

In embodiments, the resin may be a polyester resin formed by reacting a diol with a diacid in the presence of an optional catalyst.

For forming a crystalline polyester, suitable organic diols include aliphatic diols with from about 2 to about 36 carbon atoms, such as, 1,2-ethanediol, 1,3-propanediol, 1,4-butanediol, 1,5-pentanediol, 2,2-dimethylpropane-1,3-diol, 1,6-hexanediol, 1,7-heptanediol, 1,8-octanediol, 1,9-nonanediol, 1,10-decanediol, 1,12-dodecanediol and the like, including structural isomers thereof. The aliphatic diol may be, for example, selected in an amount of from about 40 to about 60 mole percent, from about 42 to about 55 mole percent, from about 45 to about 53 mole percent, and optionally, a second diol can be selected in an amount of from about 0 to about 10 mole percent, from about 1 to about 4 mole percent of the resin.

Examples of organic diacids or diesters including vinyl diacids or vinyl diesters selected for the preparation of the crystalline resins include oxalic acid, succinic acid, glutaric acid, adipic acid, suberic acid, azelaic acid, sebacic acid, fumaric acid, dimethyl fumarate, dimethyl itaconate, cis-1,4-diacetoxy-2-butene, diethyl fumarate, diethyl maleate, phthalic acid, isophthalic acid, terephthalic acid, naphthalene-2,6-dicarboxylic acid, naphthalene-2,7-dicarboxylic acid, cyclohexane dicarboxylic acid, malonic acid and mesaconic acid, a diester or anhydride thereof. The organic diacid may be selected in an amount of, for example, from about 40 to about 60 mole percent, from about 42 to about 52 mole percent, from about 45 to about 50 mole percent, and optionally, a second diacid may be selected in an amount of from about 0 to about 10 mole percent of the resin.

Examples of crystalline resins include polyesters, polyamides, polyimides, polyolefins, polyethylene, polybutylene, polyisobutyrate, ethylene-propylene copolymers, ethylene-vinyl acetate copolymers, polypropylene, mixtures thereof, and the like. Specific crystalline resins may be polyester based, such as poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), poly(decylene-sebacate), poly(decylene-decanoate), poly(ethylene-decanoate), poly(ethylene dodecanoate), poly(nonylene-sebacate), poly(nonylene-decanoate), copoly(ethylene-fumarate)-copoly(ethylene-sebacate), copoly(ethylene-fumarate)-copoly(ethylene-decanoate), copoly(ethylene-fumarate)-copoly(ethylene-dodecanoate), copoly(2,2-dimethylpropane-1,3-diol-decanoate)-copoly(nonylene-decanoate), poly(octylene-adipate). Examples of polyamides include poly(ethylene-adipamide), poly(propylene-adipamide), poly(butylenes-adipamide), poly(pentylene-adipamide), poly(hexylene-adipamide), poly(octylene-adipamide), poly(ethylene-succinimide), and poly(propylene-sebecamide). Examples of polyimides include poly(ethylene-adipimide), poly(propylene-adipimide), poly(butylene-adipimide), poly(pentylene-adipimide), poly(hexylene-adipimide), poly(octylene-adipimide), poly(ethylene-succinimide), poly(propylene-succinimide) and poly(butylene-succinimide).

The crystalline resin may be present, for example, in an amount of from about 1 to about 50 percent by weight of the toner components, from about 5 to about 35 percent by weight of the toner components. The crystalline resin may possess various melting points of, for example, from about 30° C. to about 120° C., from about 50° C. to about 90° C. The crystalline resin may have a number average molecular weight (Mn), as measured by gel permeation chromatography (GPC) of, for example, from about 1,000 to about 50,000, from about 2,000 to about 25,000, and a weight average molecular weight (Mw) of, for example, from about 2.000 to about 100,000, from about 3,000 to about 80,000, as determined by GPC. The molecular weight distribution (Mw/Mn) of the crystalline resin may be, for example, from about 2 to about 6, from about 3 to about 4.

Examples of diacids or diesters including vinyl diacids or vinyl diesters, utilized for the preparation of amorphous polyesters include dicarboxylic acids or diesters such as terephthalic acid, phthalic acid, isophthalic acid, fumaric acid, trimellitic acid, dimethyl fumarate, dimethyl itaconate, cis 1,4-diacetoxy-2-butene, diethyl fumarate, diethyl maleate, maleic acid, succinic acid, itaconic acid, succinic acid, succinic anhydride, dodecylsuccinic acid, dodecylsuccinic anhydride, glutaric acid, glutaric anhydride, adipic acid, pimelic acid, suberic acid, azelaic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and combinations thereof. The organic diacids or diesters may be present, for example, in an amount from about 40 to about 60 mole percent of the resin, from about 42 to about 52 mole percent of the resin, from about 45 to about 50 mole percent of the resin.

Examples of diols which may be utilized in generating the amorphous polyester include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hydroxyethyl)-bisphenol A, bis(2-hydroxypropyl)-bisphenol A, 1,4-cyclohexanedimethanol, 1,3-cyclohexanedimethanol, xylenedimethanol, cyclohexanediol, diethylene glycol, bis(2-hydroxyethyl) oxide, dipropylene glycol, dibutylene and combinations thereof. The amount of organic diols selected can vary, and may be present, for example, in an amount from about 40 to about 60 mole percent of the resin, from about 42 to about 55 mole percent of the resin, from about 45 to about 53 mole percent of the resin.

Polycondensation catalysts may be utilized in forming either the crystalline or amorphous polyesters and include tetraalkyl titanates, dialkyltin oxides, such as, dibutyltin oxide, tetraalkyltins, such as, dibutyltin dilaurate, and dialkyltin oxide hydroxides, such as, butyltin oxide hydroxide, aluminum alkoxides, alkyl zinc, dialkyl zinc, zinc oxide, stannous oxide or combinations thereof. Such catalysts may be utilized in amounts of, for example, from about 0.01 mole percent to about 5 mole percent based on the starting diacid or diester used to generate the polyester resin.

The amorphous resin may be present, for example, in an amount of from about 30 to about 100 percent by weight of the toner components, from about 40 to about 95 percent by weight of the toner components. In embodiments, the amorphous resin or combination of amorphous resins utilized in the latex may have a glass transition temperature (Tg) of from about 30° C. to about 80° C., from about 35° C. to about 70° C. In further embodiments, the combined resins utilized in the latex may have a melt viscosity of from about 10 to about 1,000,000 Pa*S at about 130° C. from about 50 to about 100,000 Pa*S.

One, two or more resins may be used. In embodiments, where two or more resins are used, the resins may be in any suitable ratio (e.g., weight ratio), such as, of from about 1% (first resin)/99% (second resin) to about 99% (first resin)/1% (second resin), in embodiments, from about 10% (first resin)/90% (second resin) to about 90% (first resin)/10% (second resin).

In embodiments, a suitable toner of the present disclosure may include two amorphous polyester resins and a crystalline polyester resin. The weight ratio of the three resins may be from about 30% first amorphous resin/65% second amorphous resin/5% crystalline resin, to about 60% first amorphous resin/20% second amorphous resin/20% crystalline resin.

In embodiments, a suitable toner of the present disclosure may include at least two amorphous polyester resins, a high molecular weight resin and a low molecular weight resin. As used herein, a high molecular weight (HMW) amorphous resin may have a weight average molecular weight (Mw) of from about 35,000 to about 150,000, from about 45,000 to about 140,000, and a low molecular weight (LMW) amorphous resin may have an Mw of from about 10,000 to about 30,000, from about 15,000 to about 25,000.

The weight ratio of the two resins may be from about 10% first amorphous resin/90% second amorphous resin, to about 90% first amorphous resin/10% second amorphous resin.

In embodiments, the resin may possess acid groups which, in embodiments, may be present at the terminal of the resin. Acid groups, which may be present, include carboxylic acid groups, and the like. The number of acid groups may be controlled by adjusting the materials utilized to form the resin and reaction conditions.

In embodiments, the resin may be a polyester resin having an acid number from about 2 mg KOH/g of resin to about 200 mg KOH/g of resin, from about 5 mg KOH/g of resin to about 50 mg KOH/g of resin, from about 10 mg KOH/g of resin to about 15 mg KOH/g of resin. The acid-containing resin may be dissolved in, for example, a tetrahydrofuran solution. The acid number may be detected by titration with KOH/methanol solution containing phenolphthalein as the indicator.

Other suitable resins that can be used to make toner comprise a styrene, an acrylate, such as, an alkyl acrylate, such as, methyl acrylate, ethyl acrylate, butyl acrylate, isobutyl acrylate, dodecyl acrylate, n-octyl acrylate, n-butylacrylate, 2-chloroethyl acrylate; β-carboxy ethyl acrylate (β-CEA), phenyl acrylate, methacrylate, butadienes, isoprenes, acrylic acids, acrylonitriles, styrene acrylates, styrene butadienes, styrene methacrylates, and so on, such as, methyl α-chloroacrylate, methyl methacrylate, ethyl methacrylate, butyl methacrylate, butadiene, isoprene, methacrylonitrile, acrylonitrile, vinyl ethers, such as, vinyl methyl ether, vinyl isobutyl ether, vinyl ethyl ether and the like; vinyl esters, such as, vinyl acetate, vinyl propionate, vinyl benzoate and vinyl butyrate; vinyl ketones, such as, vinyl methyl ketone, vinyl hexyl ketone, methyl isopropenyl ketone and the like; vinylidene halides, such as, vinylidene chloride, vinylidene chlorofluoride and the like; N-vinyl indole, N-vinyl pyrrolidone, methacrylate, acrylic acid, methacrylic acid, acrylamide, methacrylamide, vinylpyridine, vinylpyrrolidone, vinyl-N-methylpyridinium chloride, vinyl naphthalene, p-chlorostyrene, vinyl chloride, vinyl bromide, vinyl fluoride, ethylene, propylene, butylene, isobutylene and mixtures thereof. A mixture of monomers can be used to make a copolymer, such as, a block copolymer, an alternating copolymer, a graft copolymer and so on.

In embodiments, a first monomer composition and a second monomer composition may independently of each other comprise two or three or more different monomers. Illustrative examples of other latex copolymers include poly(styrene-n-butyl acrylate-β-CEA), poly(styrene-alkyl acrylate), poly(styrene-1,3-diene), poly(styrene-1,2-diene), poly(styrene-1,4-diene), poly(styrene-alkyl methacrylate), poly(alkyl methacrylate-alkyl acrylate), poly(alkyl methacrylate-aryl acrylate), poly(aryl methacrylate-alkyl acrylate), poly(alkyl methacrylate), poly(styrene-alkyl acrylate-acrylonitrile), poly(styrene-1,3-diene-acrylonitrile), poly(alkyl acrylate-acrylonitrile), poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene); poly(styrene-propyl acrylate), poly(styrene-butyl acrylate), poly(styrene-butadiene-acrylonitrile), poly(styrene-butyl acrylate-acrylonitrile) poly(styrene-alkyl acrylate-acrylic acid), poly(styrene-1,3-diene-acrylic acid), poly(styrene-alkyl methacrylate-acrylic acid), poly(alkyl methacrylate-acrylic acid), poly(styrene-alkyl acrylate-acrylonitrile-acrylic acid), poly(styrene-1,3-diene-acrylonitrile-acrylic acid), poly(alkyl acrylate-acrylonitrile-acrylic acid), poly(styrene-butylacrylate), poly (methyl methacrylate-isoprene), poly(styrene-butadiene-acrylic acid), poly(styrene-butadiene-methacrylic acid), poly (styrene-butadiene-acrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylonitrile-acrylic acid), poly (styrene-butadiene), poly(styrene-isoprene), poly(styrene-butyl methacrylate), poly(styrene-butyl acrylate-acrylic acid), poly(styrene-isoprene-acrylic acid), poly(styrene-butyl methacrylate-acrylic acid), poly(butyl methacrylate-butyl acrylate), poly(butyl methacrylate-acrylic acid), poly(acrylonitrile-butyl acrylate-acrylic acid), and mixtures thereof, see, for example, U.S. Pat. No. 5,227,460, the entire disclosure of which is incorporated herein by reference).

When monomer compositions are used, the weight ratio between the first monomer composition and the second monomer composition may be generally in the range of from about 0.1:99.9 to about 50:50, from about 0.5:99.5 to about 25:75, from about 1:99 to about 10:90.

An example of a composition for making a latex may be one comprising a styrene and an alkyl acrylate, such as, a mixture comprising styrene, n-butyl acrylate and β-carboxyethyl acrylate (β-CEA). Based on total weight of the monomers, styrene generally may be present in an amount from about 1% to about 99%, from about 50% to about 95%, from about 70% to about 90%, although may be present in greater or lesser amounts, alkyl acrylate, such as, n-butyl acrylate, generally may be present in an amount from about 1% to about 99%, from about 5% to about 50%, from about 10% to about 30%, although may be present in greater or lesser amounts.

The resin particles of interest are no greater than 100 nm in size, that is, are 100 nm or smaller, such as, 99 nm, 98 nm, 97 nm, 96 nm, 95 nm or smaller in size. Thus, resin particles of interest are less than 100 nm in size.

Solvent

Any suitable organic solvent may be used to dissolve the resin, for example, alcohols, esters, ethers, ketones, amines and combinations thereof, in an amount of, for example, from about 30% by weight to about 400% by weight of the resin, from about 40% by weight to about 250% by weight of the resin, from about 50% by weight to about 100% by weight of the resin.

In embodiments, suitable organic solvents, sometimes referred to herein, in embodiments, as phase inversion agents, include, for example, methanol, ethanol, propanol, IPA, butanol, ethyl acetate, MEK and combinations thereof. In embodiments, the organic solvent may be immiscible in water and may have a boiling point of from about 30° C. to about 120° C. In embodiments when at least two solvents are used, the ratio of solvents can be from about 1:2 to about 1:15, from about 1:2.5 to about 1:12.5, from about 1:3 to about 1:10, from about 1:3.5 to about 1:7.5. Thus, if the first solvent is IPA and the second solvent is MEK, the ratio of IPA to MEK can be, for example, about 1:4.

Neutralizing Agent

In embodiments, the resin may be mixed with a weak base or neutralizing agent. In embodiments, the neutralizing agent may be used to neutralize acid groups in the resins, so a neutralizing agent herein may also be referred to as a, "basic neutralization agent." Any suitable basic neutralization reagent may be used in accordance with the present disclosure. In embodiments, suitable basic neutralization agents may include both inorganic basic agents and organic basic agents. Suitable basic agents may include ammonium hydroxide, potassium hydroxide, sodium hydroxide, sodium carbonate, sodium bicarbonate, lithium hydroxide, potassium carbonate, combinations thereof and the like. Suitable basic agents may also include monocyclic compounds and polycyclic compounds having at least one nitrogen atom, such as, for example, secondary amines, which include aziridines, azetidines, piperazines, piperidines, pyridines, bipyridines, terpyridines, dihydropyridines, morpholines, N-alkylmorpholines, 1,4-diazabicyclo[2.2.2]octanes, 1,8-diazabicycloundecanes, 1,8-diazabicycloundecenes, dimethylated pentylamines, trimethylated pentylamines, pyrimidines, pyrroles, pyrrolidines, pyrrolidinones, indoles, indolines, indanones, benzindazones, imidazoles, benzimidazoles, imidazolones, imidazolines, oxazoles, isoxazoles, oxazolines, oxadiazoles, thiadiazoles, carbazoles, quinolines, isoquinolines, naphthyridines, triazines, triazoles, tetrazoles, pyrazoles, pyrazolines and combinations thereof. In embodiments, the monocyclic and polycyclic compounds may be unsubstituted or substituted at any carbon position on the ring. The pH may be increased using a basic buffer.

In embodiments, an emulsion formed in accordance with the present disclosure may also include a small quantity of water, in embodiments, deionized water (DIW), in amounts of from about 30% to about 95%, from about 30% to about 60%, at temperatures that melt or soften the resin, of from about 25° C. to about 120° C., from about 35° C. to about 80° C.

The basic agent may be utilized in an amount of from about 0.001% by weight to 50% by weight of the resin, from about 0.01% by weight to about 25% by weight of the resin, from about 0.1% by weight to 5% by weight of the resin. In embodiments, the neutralizing agent may be added in the form of an aqueous solution. In embodiments, the neutralizing agent may be added in the form of a solid. In embodiments, plural forms of bases are used in a process of interest. Hence, a process can comprise a first base, and at a different or successive step, a second base is used. The first and second bases can be the same or different.

Utilizing the above basic neutralization agent in combination with a resin possessing acid groups, a neutralization ratio of from about 25% to about 300% may be achieved, from about 50/o to about 200%. In embodiments, the neutralization ratio may be calculated as the molar ratio of basic groups provided with the basic neutralizing agent to the acid groups present in the resin multiplied by 100%.

As noted above, the basic neutralization agent may be added to a resin possessing acid groups. The addition of the basic neutralization agent may thus raise the pH of an emulsion including a resin possessing acid groups from about 5 to about 12, from about 6 to about 11. The neutralization of the acid groups may, in embodiments, enhance formation of the emulsion.

Surfactants

In embodiments, the process of the present disclosure may optionally include adding a surfactant, for example, before or during the melt mixing, to the resin at an elevated temperature, in an emulsion, in a dispersion and so on. In embodiments, the surfactant may be added prior to melt-mixing the resin at an elevated temperature.

Where utilized, a resin emulsion may include one, two or more surfactants. The surfactants may be selected from ionic surfactants and nonionic surfactants. Anionic surfactants and cationic surfactants are encompassed by the term, "ionic surfactants." In embodiments, the surfactant may be added as a solid or as a solution with a concentration of from about 5% to about 100% (pure surfactant) by weight, in embodiments, from about 10% to about 95% by weight. In embodiments, the surfactant may be utilized so that it is present in an amount of from about 0.01% to about 20% by weight of the resin, from about 0.1% to about 16% by weight, from about 1% to about 14% by weight of the resin.

Anionic surfactants which may be utilized include sulfates and sulfonates, such as, sodium dodecylsulfate (SDS), sodium dodecylbenzene sulfonate, sodium dodecylnaphthalene sulfate, dialkyl benzenealkyl sulfates and sulfonates, acids, such as, abietic acid available from Aldrich, NEOGEN®, NEOGEN™ obtained from Daiichi Kogyo Seiyaku, combinations thereof and the like. Other suitable anionic surfactants include, in embodiments, DOWFAX™ 2A 1, an alkyldiphenyloxide disulfonate from The Dow Chemical Company, and/or TAYCA POWER BN2060 from Tayca Corporation (Japan), which are branched sodium dodecylbenzene sulfonates. Combinations of those surfactants and any of the foregoing anionic surfactants may be utilized, in embodiments.

Examples of the cationic surfactants, which are usually positively charged, include, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$-trimethyl ammonium bromides, halide salts of quaternized polyoxyethylalkylamines, dodecylbenzyl triethyl ammonium chloride, MIRAPOL™ and ALKAQUATT™, available from Alkaril Chemical Company, SANIZOL™ (benzalkonium chloride), available from Kao Chemicals, and the like, and mixtures thereof.

Examples of nonionic surfactants that may be utilized for the processes illustrated herein include, for example, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy)ethanol, available from Rhone-Poulenc as IGEPAL CA210™, IGEPAL CA-520™, IGEPAL CA-720™, IGEPAL CO-890™, IGEPAL CO-720™, IGEPAL CO-290™. IGEPAL CA-210™. ANTAROX 890™, and ANTAROX 897™. Other examples of suitable nonionic surfactants may include a block copolymer of polyethylene oxide and polypropylene oxide, including those commercially available as SYNPERONIC PE/F, in embodiments. SYNPERONIC PE/F 108. Combinations of those surfactants and any of the foregoing surfactants may be utilized, in embodiments.

Processing

In embodiment, a method of phase inversion emulsification (PIE) is disclosed including combining a resin, one or more organic solvents and a neutralizing agent to form a mixture in a reaction vessel; injecting steam into the reaction vessel, and mixing the mixture, comprising turbulence induced by the steam, to emulsify the mixture, where the injecting is carried out with a steam injection nozzle including an "L" shaped nozzle, an "I" shaped nozzle and an "S" shaped nozzle; and applying a vacuum within the reaction vessel to remove the one or more solvents, where the steam injection nozzle provides increased surface contact areas between steam and the mixture relative to contacting the mixture without the nozzle. An "L" shaped nozzle can have that portion horizontal to the bottom of the vessel or that portion which is essentially perpendicular to the stem portion that conducts the steam from a generator into the vessel to be located at any depth in the vessel.

The nozzle can be an open-ended structure, that is, the nozzle ends or terminates within the vessel, and hence, emulsion, or can be a closed loop structure where the nozzle ends or terminates outside of the vessel holding the emulsion. Hence, one end of the nozzle is attached to a steam generating device. For a closed loop structure, the nozzle terminates outside of the vessel, for example, connected to a device or to a collecting vessel and so on.

In embodiments, the nozzle comprises a vertical, steam conducting portion to transport steam from a generator external to the mixing vessel into the mixing vessel and in embodiments, to the lower portions of the mixing vessel. The conducting portion is in communication with a portion horizontal relative to the bottom of the mixing vessel or essentially perpendicular to the vertical, conducting portion, located in the lower portion of the mixing vessel. In embodiments, the horizontal portion can rest on the bottom of the mixing vessel. In embodiments, the horizontal portion generally tracks the inside perimeter of the mixing vessel, all or in part. Hence, for example, the horizontal portion of the nozzle can have a circular configuration, a coil, similar to a burner on an electric stove, a semicircle and so on, and the density of holes for releasing steam on the horizontal portion of the nozzle can be or any size, density and pattern as described herein to provide for contact between steam and the mixture within the vessel.

In embodiments, the nozzle can comprise one that is "I" shaped which is placed to run parallel to and adjacent to the stem or shaft of an impeller mechanism. In embodiments, the stem can be conducted in the stem or shaft, either with a separate tubing or not, where the stem or shaft comprises one or more holes for steam release into the mixture.

The number of holes and the placement of holes in a nozzle can vary, with a goal being to maximize contact between steam and the fluid mixture. The steam can contribute to mixing of the liquid. Hence, for example, the holes can be directed toward the center of the vessel, toward the wall of the vessel and so on, in any number and separated by any distance as a design choice. The size of a hole can be of any suitable size, for example to maximize the amount of steam introduced into the emulsion, to maximize the mixing of the emulsion and so on. The size of the holes in a nozzle can be uniform or can vary, as a design choice.

In embodiments, the steam injection nozzle is "L" shaped or "I" shaped and comprises high density punched holes. In embodiments, the steam injection nozzle is "I" shaped, and contains a single hole.

The present process may include melt mixing a mixture at an elevated temperature containing at least one amorphous resin, at least one organic solvent, optionally a surfactant, and a neutralizing agent to form a latex emulsion. In embodiments, the resins may be pre-blended prior to melt mixing.

In embodiments, the elevated temperature may be a temperature below, near to or above the $T_g$ of the amorphous resins. In embodiments, the resin may be a mixture of low and high molecular weight amorphous resins.

Thus, in embodiments, a process of the present disclosure may include contacting a resin with an organic solvent to form a resin mixture, heating the resin mixture to an elevated temperature, stirring the mixture, adding a neutralizing agent to neutralize the acid groups of the resin, adding water dropwise into the mixture until phase inversion occurs to form a phase inversed latex emulsion, distilling the latex to remove a water solvent mixture in the distillate and producing a high quality latex.

In embodiments, steam injection is applied at a temperature between about 105° C. to about 120° C. In embodiments, the resin and the organic solvent are heated to between about 40° C. and about 50° C. to dissolve the resin, where the mixture is then cooled to room temperature before addition of a neutralizing agent. Subsequently, the mixture is exposed to steam yielding an emulsion with a temperature from about 70° C. and about 80° C.

In the phase inversion process, the resin(s) may be dissolved in a low boiling point organic solvent, which solvent is miscible or partially miscible in water, such as, MEK and any other solvent noted hereinabove, at a concentration of from about 1% by weight to about 75% by weight resin in solvent, from about 5% by weight to about 60° by weight resin in solvent. The resin mixture is then heated to a temperature of from about 25° C. to about 90° C., from about 30° C. to about 85° C. The heating need not be held at a constant temperature, but may be varied. For example, the heating may be slowly or incrementally increased until a desired temperature is achieved.

In accordance with processes as disclosed, a latex may be obtained using a more than one PIE process which requires dispersing and solvent stripping steps. In that process, the resin may be dissolved in an organic solvent, for example, MEK and IPA, to produce a homogenous organic phase. An amount of base solution (such as, ammonium hydroxide) or buffer is then added into the organic phase followed by the addition of DIW to form a uniform dispersion of resin particles in water through phase inversion. The organic solvent remains in the particles and water phase. Through, generally, vacuum distillation, for example, the solvent(s) can be stripped. In embodiments, the resin to solvent (for example, MEK and IPA) ratio may be from about 10:8 to about 10:12, from about 10:8.5 to about 10:11.5, from about 10:9 to about 10:11. When two solvents are used, and an LMW resin is included, the ratio of the LMW resin to the first and to the second solvents can be from about 10:6:1.5 to about 10:10:2.5. When an HMW resin is included with two solvents, the ratio of the HMW resin to the first and to the second solvents can be from about 10:8:2 to about 10:11:3, although amounts outside of those ranges noted above can be used.

In embodiments, the neutralizing agent includes the agents mentioned hereinabove. In embodiments, a surfactant may or may not be added to the resin, where the surfactant when utilized may be any of the surfactants mentioned hereinabove to obtain a latex with lower coarse content, where a coarse particle is greater than 100 nm in size.

In embodiments, the optional surfactant may be added to the one or more ingredients of the resin composition before, during or after melt-mixing. In embodiments, the surfactant may be added before, during or after addition of the neutralizing agent. In embodiments, the surfactant may be added prior to the addition of the neutralizing agent. In embodiments, a surfactant may be added to the pre-blend mixture prior to melt mixing.

The melt-mixing temperature may be from about 35° C. to about 100° C., from about 40° C. to about 90° C., from about 50° C. to about 70° C.

Once the resins, neutralizing agent and optional surfactant are melt mixed, the mixture may then be contacted with steam, to form a latex emulsion. Steam may be added to form a latex emulsion with a solids content of from about 5% to about 60%, from about 10% to about 50%. While higher steam temperatures may accelerate emulsification, in embodiments, steam temperatures may be from about 70° C. to about 110° C., from about 75° C. to about 105° C.

Melt mixing may be conducted, in embodiments, utilizing any means within the purview of those skilled in the art. For example, melt mixing may be conducted in a glass kettle with an anchor blade impeller, an extruder, i.e., a twin screw extruder, a kneader, such as, a Haake mixer and so on, in a batch reactor or any other device capable of intimately mixing viscous materials to create near or homogenous mixtures.

Stirring, although not necessary, may be utilized to enhance formation of the latex. Any suitable stirring device may be utilized. In embodiments, the stirring may be at a speed of from about 10 revolutions per minute (rpm) to about 5,000 rpm, from about 20 rpm to about 2,000 rpm, from about 50 rpm to about 1,000 rpm. The stirring need not be at a constant speed and may be varied. For example, as the heating of the mixture becomes more uniform, the stirring rate may be increased. In embodiments, a homogenizer (that is, a high shear device), may be utilized to form the phase inversed emulsion, in embodiments, the process of the present disclosure may take place without the use of a homogenizer. Where utilized, a homogenizer may operate at a rate of from about 3,000 rpm to about 10,000 rpm.

Although the point of phase inversion may vary depending on the components of the emulsion, the temperature of heating, the stirring speed, and the like, phase inversion may occur when the basic neutralization agent, optional surfactant, and/or water has been added so that the resulting resin is present in an amount from about 5% by weight to about 70% by weight of the emulsion, from about 20% by weight to about 65% by weight, from about 30% by weight to about 60% by weight of the emulsion.

Following phase inversion, additional optional surfactant, water, and/or aqueous alkaline solution may optionally be added to dilute the phase inversed emulsion, although not required. Following phase inversion, the phase inversed emulsion may be cooled to room temperature, for example from about 20° C. to about 25° C.

In embodiments, distillation with stirring of the organic solvent may be performed to provide resin emulsion particles with an average diameter size of between about 205 nm and 270 nm, about 215 and about 250 nm, or about 230 nm to about 240 nm, although sizes outside of those ranges can be used as a design choice.

The desired properties of the amorphous polyester emulsion (i.e., particle size and low residual solvent level) may be achieved by adjusting the solvent and neutralizer concentration and process parameters (i.e., reactor temperature, vacuum and process time).

In embodiments, a Steam Injection Emulsification (SIE) system is disclosed including: a reaction vessel containing one or more conduits in fluid communication with the reactor vessel and an impeller; a steam injection nozzle connected to one of the one or more conduits, where the steam injection nozzle includes an "L" shaped nozzle, an "I" shaped nozzle and an "S" shaped nozzle, and where the steam injection nozzle is in fluid communication with the reaction vessel; and another one of the one or more conduits attached to a device to produce a vacuum within the reaction vessel, where the steam injection nozzle is configured to provide increased surface contact areas between steam and a mixture comprising a resin and a solvent relative to contacting steam and said mixture without said nozzle.

The coarse content of the latex of the present disclosure, that is, particles that are larger than most prevalent or desired population of particles, may be from about 0.01% to about 5% by size, from about 0.1% to about 3% by size greater than the upper 95% confidence limit of the population mean size of the particles. The solids content of the latex of the present disclosure may be from about 10% by weight to about 60%, from about 20% by weight to about 50% by weight.

Toner

Once the resin mixture has been contacted with water to form an emulsion and the solvent removed from the mixture as described above, the resulting latex may then be utilized to form a toner by any method within the purview of those skilled in the art. The latex emulsion may be contacted with an optional colorant, optionally in a dispersion, and other additives to form a toner by a suitable process, in embodiments, an emulsion aggregation and coalescence process.

In embodiments, the optional additional ingredients of a toner composition including optional colorant, wax and other additives, may be added before, during or after melt mixing the resin to form the latex emulsion of the present disclosure. The additional ingredients may be added before, during or after formation of the latex emulsion.

Colorants

As the colorant that may be added, various known suitable colorants, such as dyes, pigments, mixtures of dyes, mixtures of pigments, mixtures of dyes and pigments, and the like, may be included in the toner. In embodiments, the colorant, when present, may be included in the toner in an amount of, for example, from 0 to about 35% by weight of the toner, from about 1 to about 25% by weight of the toner, from about 3 to about 5% by weight of the toner, although the amount of colorant can be outside of those ranges, such as, about 7%, about 7.5%, about 8% by weight of the toner.

As examples of suitable colorants, mention may be made of carbon black like REGAL 330® (Cabot), Carbon Black 5250 and 5750 (Columbian Chemicals), Sunsperse Carbon Black LHD 9303 (Sun Chemicals); magnetites, such as Mobay magnetites MO8029™, MO8060™; Columbian magnetites; MAPICO BLACKS™ and surface treated magnetites; Pfizer magnetites CB4799™, CB5300™, CB5600™, MCX6369™; Bayer magnetites, BAYFERROX 8600™, 8610™; Northern Pigments magnetites, NP-604™, NP-608™; Magnox magnetites TMB-100™ or TMB-104™; and the like. As colored pigments, there can be selected cyan, magenta, yellow, red, green, brown, blue or mixtures thereof. Generally, cyan, magenta or yellow pigments or dyes or mixtures thereof, are used. The pigment or pigments are generally used as water-based pigment dispersions.

In embodiments, the colorant may include a pigment, a dye, combinations thereof, carbon black, magnetite, black, cyan, magenta, yellow, red, green, blue, brown, combinations thereof, in an amount sufficient to impart the desired color to the toner. It is to be understood that other useful colorants will become readily apparent based on the present disclosures.

Wax

Optionally, a wax may also be combined with the resin and an optional colorant in forming toner particles. The wax may be provided in a wax dispersion, which may include a single type of wax or a mixture of two or more different waxes.

When included, the wax may be present in an amount of, for example, from about 1% by weight to about 25% by weight of the toner particles, from about 5% by weight to about 20% by weight of the toner particles, although the amount of wax can be outside of those ranges.

When a wax dispersion is used, the wax dispersion may include any of the various waxes conventionally used in emulsion aggregation toner compositions. Waxes that may be selected include waxes having, for example, an average molecular weight of from about 500 to about 20,000, from about 1,000 to about 10,000.

In embodiments, the wax may be incorporated into the toner in the form of one or more aqueous emulsions or dispersions of solid wax in water, where the solid wax particle size may be in the range of from about 100 to about 500 nm.

Toner Preparation

The toner particles may be prepared by any method within the purview of one skilled in the art. Although embodiments relating to toner particle production are described below with respect to emulsion aggregation processes, any suitable method of preparing toner particles may be used, including, chemical processes, such as, suspension and encapsulation processes disclosed in U.S. Pat. Nos. 5,290,654 and 5,302,486, the disclosure of each of which hereby is incorporated by reference in entirety. In embodiments, toner compositions and toner particles may be prepared by aggregation and coalescence processes in which smaller-sized resin particles are aggregated to the appropriate toner particle size and then coalesced to achieve the final toner particle shape and morphology.

In embodiments, toner compositions may be prepared by emulsion aggregation processes, such as, a process that includes aggregating a mixture of an optional colorant, an optional wax and any other desired or required additives, and emulsions including the resins described above, optionally in surfactants as described above, and then coalescing the aggregate mixture. A mixture may be prepared by adding a colorant and optionally a wax or other materials, which may also be optionally in a dispersion(s) including a surfactant, to the emulsion, which may be a mixture of two or more emulsions containing the resin. The pH of the resulting mixture may be adjusted by an acid such as, for example, acetic acid, nitric acid or the like. In embodiments, the pH of the mixture may be adjusted to from about 2 to about 5. Additionally, in embodiments, the mixture may be homogenized. If the mixture is homogenized, that may be by mixing at about 600 to about 6,000 rpm. Homogenization may be accomplished by any suitable means, including, for example, an IKA ULTRA TURRAX T50 probe homogenizer.

Following the preparation of the above mixture, an aggregating agent may be added to the mixture. Any suitable aggregating agent may be utilized to form a toner. Suitable aggregating agents include, for example, aqueous solutions of a divalent cation or a multivalent cation material. The aggregating agent may be, for example, an inorganic cationic aggregating agent, such as, polyaluminum halides, such as, polyaluminum chloride (PAC), or the corresponding bromide, fluoride or iodide, polyaluminum silicates, such as, polyaluminum sulfosilicate (PASS), and water soluble metal salts, including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, zinc chloride, zinc bromide, magnesium bromide, copper chloride, copper sulfate and combinations thereof. In embodiments, the aggregating agent may be added to the mixture at a temperature that is below the Tg of the resin.

The aggregating agent may be added to the mixture utilized to form a toner in an amount of, for example, from about 0.1% to about 10% by weight, from about 0.2% to about 8% by weight, from about 0.3% to about 5% by weight, of the resin in the mixture.

The particles may be permitted to aggregate until a predetermined desired particle size is obtained. Particle size can be monitored during the growth process, for example with a COULTER COUNTER, for average particle size. The aggregation may proceed by maintaining the elevated temperature, or slowly raising the temperature to, for example, from about 40° C. to about 100° C., and holding the mixture at that temperature for a time of from about 0.5 hours to about 6 hours, from about hour 1 to about 5 hours, while maintaining stirring, to provide the aggregated particles. Once the predetermined desired particle size is reached, a shell resin can be added.

Once the desired final size of the toner particles is achieved, the pH of the mixture may be adjusted with a base or a buffer to a value of from about 3 to about 10, from about 5 to about 9. The adjustment of the pH may be utilized to freeze, that is, to stop, toner particle growth. The base utilized to stop toner growth may include any suitable base such as, for example, alkali metal hydroxides, such as, for example, sodium hydroxide, potassium hydroxide, ammonium hydroxide, combinations thereof and the like. In embodiments, a chelator, such as, ethylene diamine tetraacetic acid (EDTA), may be added to help adjust the pH to the desired values noted above.

In embodiments, a method of preparing a toner may include combining a resin, a solvent and a neutralizing agent, to form a mixture in a reaction vessel; injecting steam into the reaction vessel, and mixing the mixture, comprising turbulence induced by the steam, to emulsify the mixture, where the injecting is carried out with a steam injection nozzle selected from an "L" shaped nozzle, an "I" shaped nozzle or an "S" shaped nozzle; applying a vacuum within the reaction vessel to remove the solvent to form an emulsion; adding an optional at least a second resin to the emulsion; optionally adding a wax, a colorant or both to the emulsion; optionally adding a flocculent to the emulsion; aggregating particles in the emulsion; freezing particle growth in the emulsion to form frozen particles; optionally adding a shell resin; optionally coalescing the frozen particles in the emulsion to form toner particles; and collecting the frozen particles or the toner particles from the emulsion, where the steam injection nozzle provides increased surface contact areas between steam and the mixture relative to preparing the emulsion without steam.

Shell Resin

In embodiments, after aggregation, but prior to coalescence, a resin coating may be applied to the aggregated particles to form a shell thereover. In embodiments, the core may thus include a resin as described above or as known in the art.

Multiple resins may be utilized in any suitable amounts. Thus, a first resin may be present in an amount of from about 20% by weight to about 100% by weight of the total shell resin, from about 30% by weight to about 90% by weight of the total shell resin. In embodiments, a second resin may be present in the shell resin in an amount of from about 0 percent by weight to about 80 percent by weight of the total shell resin, from about 10 percent by weight to about 70 percent by weight of the shell resin.

The formation of the shell over the aggregated particles may occur while heating to a temperature of from about 30° C. to about 80° C., from about 35° C. to about 70° C. Formation of the shell may take place for a period of time of from about 5 min to about 10 hr, from about 10 minutes to about 5 hours.

The shell may be present in an amount of from about 10% by weight to about 40% by weight of the latex particles, from about 20% by weight to about 35% by weight of the latex particles.

In embodiments, the final size of the toner particles may be less than about 8 μm, less than about 7 μm, less than about 6 μm in size.

Coalescence

Following aggregation to the desired particle size and application of any optional shell, the particles may then be coalesced to the desired final shape, the coalescence being achieved by, for example, heating the mixture to a temperature of from about 45° C. to about 100° C., from about 55° C. to about 99° C., which may be at or above the Tg of the resin(s) utilized to form the toner particles. Coalescence may be accomplished over a period of from about 0.01 to about 9 hours, from about 0.1 to about 4 hours.

After aggregation and/or coalescence, the mixture may be cooled to room temperature, such as, from about 20° C. to about 25° C. The cooling may be rapid or slow, as desired. A suitable cooling method may include introducing cold water to a jacket around the reactor. After cooling, the toner particles may be optionally washed with water and then dried. Drying may be accomplished by any suitable method for drying, including, for example, freeze-drying.

Additives

In embodiments, the toner particles may contain other optional additives, as desired or required. For example, the toner may include positive or negative charge control agents, for example, in an amount of from about 0.1 to about 10% by weight of the toner, from about 1 to about 3% by weight of the toner. Examples of suitable charge control agents include quaternary ammonium compounds inclusive of alkyl pyridinium halides; bisulfates; alkyl pyridinium compounds, including those disclosed in U.S. Pat. No. 4,298,672, the disclosure of which is hereby incorporated by reference in entirety; organic sulfate and sulfonate compositions, including those disclosed in U.S. Pat. No. 4,338,390, the disclosure of which is hereby incorporated by reference in entirety; cetyl pyridinium tetrafluoroborates; distearyl dimethyl ammonium methyl sulfate; aluminum salts, such as, BONTRON E84™ or E88™ (Orient Chemical Industries, Ltd.); combinations thereof and the like.

There can also be blended with the toner particles external additive particles after formation including flow aid additives, which additives may be present on the surface of the toner particles. Examples of the additives include metal oxides, such as, titanium oxide, silicon oxide, aluminum oxides, cerium oxides, tin oxide, mixtures thereof and the like; colloidal and amorphous silicas, such as, AEROSIL®, metal salts and metal salts of fatty acids inclusive of zinc stearate and calcium stearate, or long chain alcohols, such as, UNILIN 700, and mixtures thereof.

In general, silica may be applied to the toner surface for toner flow, tribo enhancement, admix control, improved development and transfer stability, and higher toner blocking temperature. $TiO_2$ may be applied for improved relative humidity (RH) stability, tribo control and improved development and transfer stability. Zinc stearate, calcium stearate and/or magnesium stearate may be used as an external additive for providing lubricating properties, developer conductivity, tribo enhancement and enabling higher toner charge and charge stability by increasing the number of contacts between toner and carrier particles. In embodiments, a commercially available zinc stearate known as Zinc Stearate L, obtained from Ferro Corp., may be used. The external surface additives may be used with or without a coating.

Each of the external additives may be present in an amount of from about 0.1% by weight to about 5% by weight of the toner, from about 0.25% by weight to about 3% by weight of the toner, although the amount of additives can be outside of those ranges. In embodiments, the toners may include, for example, from about 0.1% by weight to about 5% by weight titania, from about 0.1% by weight to about 8% by weight silica and from about 0.1% by weight to about 4% by weight zinc stearate.

Suitable additives include those disclosed in U.S. Pat. Nos. 3,590,000, 3,800,588 and 6,214,507, the disclosure of each of which hereby is incorporated by reference in entirety.

In embodiments, toners of the present disclosure may be utilized as ultra low melt (ULM) toners.

In embodiments, the dry toner particles with or without a shell of the present disclosure may, exclusive of external surface additives, have the following characteristics: (1) volume average diameter (also referred to as "volume average particle diameter") of from about 3 to about 25 μm, from about 4 to about 15 μm, from about 5 to about 12 μm; (2) number average geometric size distribution (GSDn) and/or volume average geometric size distribution (GSDv) of from about 1.05 to about 1.55, from about 1.1 to about 1.4; and (3) circularity of from about 0.93 to about 1, in embodiments, from about 0.95 to about 0.99 (as measured with, for example, a Sysmex FPIA 2100 analyzer).

The characteristics of toner particles may be determined by any suitable technique and apparatus, such as, a Beckman Coulter MULTISIZER 3.

The subject matter now will be exemplified in the following non-limiting examples. Parts and percentages are by weight unless otherwise indicated. As used herein, "room temperature," (RT) refers to a temperature of from about 20° C. to about 30° C.

EXAMPLES

Example 1

"L" Shaped Steam Injection Nozzle with High Density Punched Holes

One hundred grams of a 35,000 molecular weight amorphous polyester resin was dissolved in 100 g MEK and 10 g IPA at room temperature. The resin solution was transferred to a 1 L glass Buchi reactor, followed by addition of ammonium hydroxide to form a resin composition. The amount of ammonium hydroxide was estimated based on the neutralization ratio (NR) according the following equation:

NR(equivalent amount of 10% $NH_3.H_2O$/resin (g))= Resin AV/1.01*100.

Figure 2:
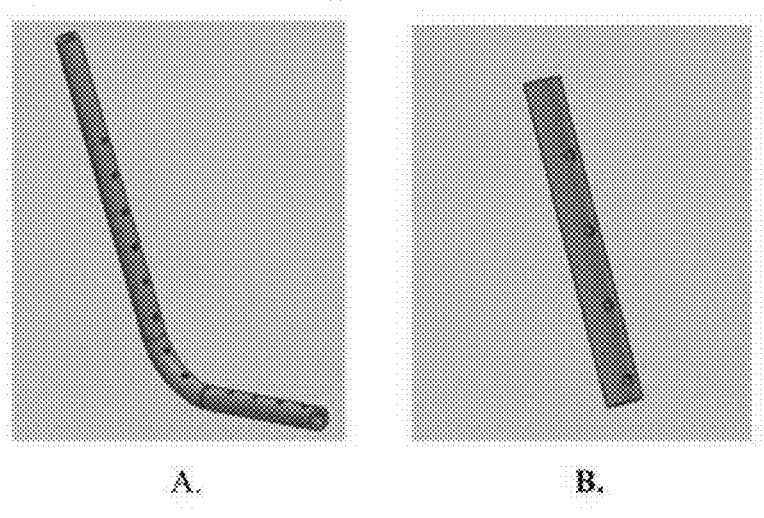
FIG. 2 shows different configurations of steam injection nozzles and different density of holes punched on the steam injection nozzles, which different configurations provide different surface contact areas between steam and resin composition solution (left panel: "L" shaped nozzle, high density holes; right panel; "I" shaped nozzle, low density holes).
Figure 3:
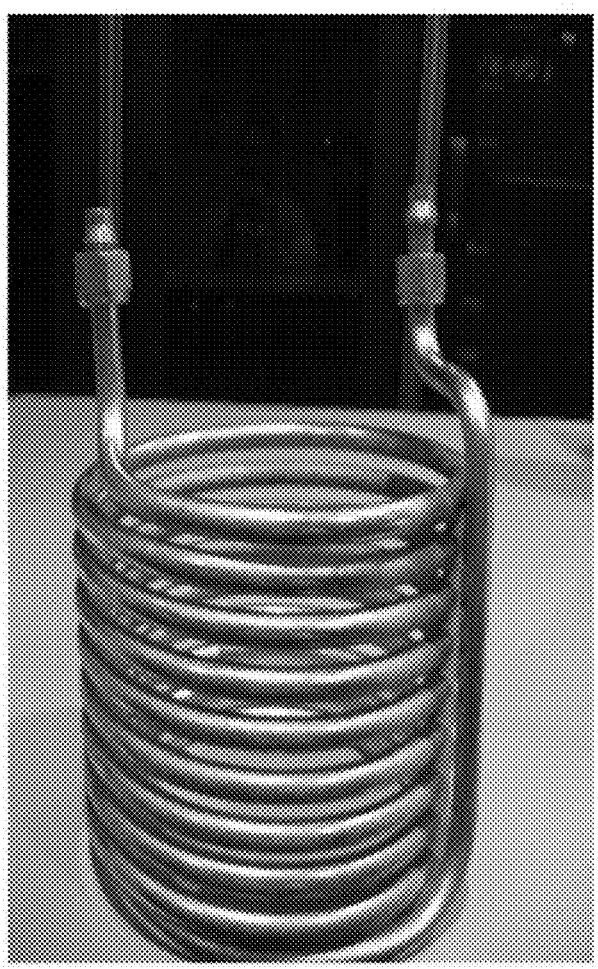
FIG. 3 depicts a form of an "S" shaped nozzle in the form of a spiral, spring, coil or a helix. The "S" shaped nozzle can comprise any number of coils, turns, loops and so on, that in the figure comprises about 10 loops. Although not depicted, the nozzle can comprise any number of holes to vent steam along the length of the nozzle, and the holes can oriented to direct steam inward within the coil, outward outside of the coil or both, as a design choice. The depicted nozzle also is a closed loop as the end of the nozzle exits out of the vessel containing the emulsion to course any remaining steam or water out of the vessel.

The resin was loaded in a reactor. A steam generator using DIW was used to introduce steam at ~103° C. An axial flow impeller was used for external mixing. Emulsification started when the steam was injected through the "L" shaped steam injection nozzle shown in FIG. 2a into the resin composition. Once emulsification was finished, vacuum was resumed for removing solvent from the emulsion. The experiment was stopped after 50 min with particles having a size of ~267 nm.

Example 2

"I" Shaped Steam Injection Nozzle with High Density Punched Holes

Example 1 was practiced with the only difference being the steam injection tube design.

The particles were ~267 nm in size.

Example 3

"I" Shaped Steam Injection Nozzle with Only One End Hole

About 2.5 kg MEK, 0.258 g IPA and 2.5 kg of the resin of Example 1 were charged into a 5 gallon reactor. The contents were mixed at 80 RPM and heated to 42.5° C. over 2 hours to dissolve resin. The reactor was cooled to room temperature followed by addition of ammonium hydroxide to form resin composition using the formula of Example 1.

The resin composition was mixed at 80 RPM for 10 minutes. Steam was introduced into the reactor for over 40 minutes to form a latex. Steam addition was continued to maintain temperature at 75° C. and a vacuum was applied slowly to remove the solvents. The process was terminated with gas chromatography (GC) revealed the IPA and MEK levels to be ~300 ppm. The particles were ~206 nm in size.

TABLE 1

GC analysis data for residual solvents.

| Latex | Residual solvent (ppm) | |
|---|---|---|
| | MEK | IPA |
| Example 1 | 282 | 648 |
| Example 2 | 1800 | 2200 |
| Example 3 | 14 | 5 |

It will be appreciated that various of the above-disclosed and other features and functions, or alternatives thereof, may be desirably combined into many other different systems or applications. Also various presently unforeseen or unanticipated alternatives, modifications, variations or improvements therein may be subsequently made by those skilled in the art, which are also intended to be encompassed by the following claims. Unless specifically recited in a claim, steps or components of claims should not be implied or imported from the specification or any other claims as to any particular order, number, position, size, shape, angle, color or material.

All references cited herein are herein incorporated by reference in entirety.

We claim:

1. A method of phase inversion emulsification (PIE) comprising:
   a) combining a resin, an organic solvent and an optional neutralizing agent to form a mixture in a reaction vessel;
   b) injecting steam into said reaction vessel inducing turbulence in said mixture, wherein said injecting is by a steam injection nozzle selected from the group consisting of an "L" shaped nozzle, an "I" shaped nozzle and an "S" shaped nozzle;
   c) mixing said mixture to emulsify said mixture; and
   c) reducing pressure within said reaction vessel to remove said solvent,
   wherein said steam injection nozzle provides increased surface contact areas between steam and said mixture relative to contacting steam and said mixture without said nozzle.

2. The method of claim 1, wherein the steam injection nozzle is "L" shaped or "I" shaped, and wherein said steam injection nozzle comprises high density punched holes.

3. The method of claim 1, wherein the steam injection nozzle is "I" shaped, and wherein said "I" shaped nozzle contains a single hole.

4. The method of claim 1, wherein steam injection is applied at a temperature between about 100° C. to about 130° C.

5. The method of claim 1, wherein said solvent is selected from the group consisting of methanol, ethanol, isopropanol, butanol, ethylene glycol, glycerol, sorbitol, acetone, 2-butanone, 2-pentanone, 3-pentanone, ethyl isopropyl ketone, methyl isobutyl ketone, diisobutyl ketone, methyl ethyl ketone, dimethylformamide, dimethylacetamide, N-methylpyrrolidone, 1,2-dimethyl-2-imidazolidinone, acetonitrile, propionitrile, butyronitrile, isobutyronitrile, valeronitrile, benzonitrile, ditertbutyl ether, dimethoxyethane, 2-methoxyethyl ether, 1,4-dioxane, tetrahydrohyran, morpholine, methylsulfonylmethane, sulfolane, dimethylsulfoxide, hexamethylphosphoramide, benzenes esters and amines.

6. The method of claim 1, comprising at least two solvents.

7. The method of claim 6, wherein said at least two solvents comprise methyl ethyl ketone and isopropyl alcohol.

8. The method of claim 1, wherein the neutralizing agent is selected from the group consisting of ammonium hydroxide, potassium hydroxide, sodium hydroxide, sodium carbonate, sodium bicarbonate, lithium hydroxide, potassium carbonate, potassium bicarbonate, secondary amines, which include aziridines, azetidines, piperazines, piperidines, pyridines, bipyridines, terpyridines, dihydropyridines, morpholines, N-alkylmorpholines, 1,4-diazabicyclo[2.2.2]octanes, 1,8-diazabicycloundecanes, 1,8-diazabicycloundecenes, dimethylated pentylamines, trimethylated pentylamines, pyrimidines, pyrroles, pyrrolidines, pyrrolidinones, indoles, indolines, indanones, benzindazones, imidazoles, benzimidazoles, imidazolones, imidazolines, oxazoles, isoxazoles, oxazolines, oxadiazoles, thiadiazoles, carbazoles, quinolines, isoquinolines, naphthyridines, triazines, triazoles, tetrazoles, pyrazoles, pyrazolines, and combinations thereof.

9. The method of claim 1, wherein the resin and the solvent are mixed and heated to about 40° C. to about 50° C. to dissolve said resin.

10. The method of claim 9, wherein the heated mixture is cooled to about room temperature and the neutralizing agent is added to said cooled mixture.

11. A method of preparing a toner comprising:
   a) combining a resin, an organic solvent and an optional neutralizing agent to form a mixture in a reaction vessel;
   b) injecting steam into said reaction vessel inducing turbulence in said mixture, wherein said injecting is by a steam injection nozzle selected from the group consisting of an "L" shaped nozzle, an "I" shaped nozzle and an "S" shaped nozzle;
   c) mixing said mixture to emulsify said mixture,
   d) reducing pressure within said reaction vessel to remove said solvent to form an emulsion;
   e) adding an optional at least one second resin to said emulsion;
   f) optionally adding a crystalline resin to said emulsion;
   g) optionally adding a wax, a colorant or both to said emulsion;
   h) optionally adding a flocculent to the emulsion;
   i) aggregating particles in said emulsion;
   j) optionally adding a shell resin;
   k) freezing particle growth in said emulsion to form frozen particles;
   l) optionally coalescing said frozen particles in said emulsion to form toner particles; and
   m) collecting said frozen particles or said toner particles from said emulsion, wherein said steam injection increases surface contact areas between water and said mixture relative to preparing the emulsion without steam.

12. The method of claim 11, wherein the steam injection nozzle is "L" shaped or "I" shaped, and wherein said steam injection nozzle comprises high density punched holes.

13. The method of claim 11, wherein the steam injection nozzle is "I" shaped, and wherein said "I" shaped nozzle contains a single hole.

14. The method of claim 11, wherein steam injection is applied at a temperature between about 100° C. to about 130° C.

15. The method of claim 11, wherein said solvent is selected from the group consisting of methanol, ethanol, isopropanol, butanol, ethylene glycol, glycerol, sorbitol, acetone, 2-butanone, 2-pentanone, 3-pentanone, ethyl isopropyl ketone, methyl isobutyl ketone, diisobutyl ketone, methyl ethyl ketone, dimethylformamide, dimethylacetamide, N-methylpyrrolidone, 1,2-dimethyl-2-imidazolidinone, acetonitrile, propionitrile, butyronitrile, isobutyronitrile, valeronitrile, benzonitrile, ditertbutyl ether, dimethoxyethane, 2-methoxyethyl ether, 1,4-dioxane, tetrahydrohyran, morpholine, methylsulfonylmethane, sulfolane, dimethylsulfoxide, hexamethylphosphoramide, benzenes esters and amines.

16. The method of claim 11, comprising at least two solvents.

17. The method of claim 16, wherein said at least two solvents comprise methyl ethyl ketone and isopropyl alcohol.

18. The method of claim 11, wherein the neutralizing agent is selected from the group consisting of ammonium hydroxide, potassium hydroxide, sodium hydroxide, sodium carbonate, sodium bicarbonate, lithium hydroxide, potassium carbonate, potassium bicarbonate, secondary amines, which include aziridines, azetidines, piperazines, piperidines, pyridines, bipyridines, terpyridines, dihydropyridines, morpholines, N-alkylmorpholines, 1,4-diazabicyclo[2.2.2]octanes, 1,8-diazabicycloundecanes, 1,8-diazabicycloundecenes, dimethylated pentylamines, trimethylated pentylamines, pyrimidines, pyrroles, pyrrolidines, pyrrolidinones, indoles, indolines, indanones, benzindazones, imidazoles, benzimidazoles, imidazolones, imidazolines, oxazoles, isoxazoles, oxazolines, oxadiazoles, thiadiazoles, carbazoles, quinolines, isoquinolines, naphthyridines, triazines, triazoles, tetrazoles, pyrazoles, pyrazolines, and combinations thereof.

19. The method of claim 11, wherein the resin and the solvent are mixed and heated to about 40° C. to about 45° C. for a sufficient time to dissolve the resin, wherein the heated mixture is cooled to about room temperature, and wherein the neutralizing agent is added to said cooled mixture.

20. A Steam Injection Emulsification (SIE) system comprising:
  a) a reaction vessel comprising:
    i) two or more conduits in fluid communication with said reaction vessel and
    ii) an impeller; and
  b) a steam injection nozzle connected to one of said two or more conduits, wherein said steam injection nozzle is selected from the group consisting of an "L" shaped nozzle, an "I" shaped nozzle and an "S" shaped nozzle, and wherein said steam injection nozzle is in fluid communication with said reaction vessel;
wherein said steam injection nozzle is configured to provide increased surface contact areas between steam and a mixture comprising a resin and a solvent relative to contacting steam and said mixture without said nozzle.

21. The method of claim 6, wherein one of said at least two solvents has a greater affinity for water than a second of said at least two solvents.

22. The method of claim 6, wherein removal efficiency after reducing pressure for each of the at least two solvents is equivalent.

\* \* \* \* \*